United States Patent
Dasdan et al.

(10) Patent No.: US 8,612,424 B2
(45) Date of Patent: Dec. 17, 2013

(54) SYSTEM AND METHOD FOR OPTIMIZING SEARCH RESULTS RANKING THROUGH COLLABORATIVE GAMING

(75) Inventors: Ali Dasdan, San Jose, CA (US);
Santanu Kolay, San Jose, CA (US);
Chris Drome, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/372,631

(22) Filed: Feb. 14, 2012

(65) Prior Publication Data
US 2012/0149470 A1    Jun. 14, 2012

Related U.S. Application Data

(63) Continuation of application No. 12/684,878, filed on Jan. 8, 2010, now Pat. No. 8,140,518.

(51) Int. Cl.
*G06F 7/00* (2006.01)
*G06F 17/30* (2006.01)

(52) U.S. Cl.
USPC ............... 707/719; 77/705; 77/723; 77/805

(58) Field of Classification Search
USPC ...................................................... 707/719
See application file for complete search history.

(56) References Cited

U.S. PATENT DOCUMENTS

| | | | |
|---|---|---|---|
| 7,789,741 B1 * | 9/2010 | Fields et al. | 463/2 |
| 8,079,907 B2 * | 12/2011 | Egozy | 463/42 |
| 2003/0093168 A1 * | 5/2003 | Nagaoka | 700/91 |
| 2007/0191105 A1 * | 8/2007 | Azuma | 463/42 |
| 2009/0181774 A1 * | 7/2009 | Ratcliff | 463/42 |
| 2010/0317444 A1 * | 12/2010 | Chandrasekar et al. | 463/43 |
| 2011/0092273 A1 * | 4/2011 | Cerbini | 463/25 |

* cited by examiner

*Primary Examiner* — Wilson Lee
*Assistant Examiner* — Jessica N Le
(74) *Attorney, Agent, or Firm* — Pillsbury Winthrop Shaw Pittman LLP

(57) ABSTRACT

The present invention provides a method and system for optimizing search result rankings through use of a game interface. The method and system includes providing a game interface to at least two users, the game interface comprising at least one search query and at least two search result sets. The method and system further includes detecting the selection of one of the two search result sets by the users based on competition criteria and updating ranking data in response to the selection of one of the two search results. The method and system further includes selecting ranking data associated with a given query, determining an optimum ranking based on aggregating the selected ranking data, and storing the optimum ranking.

18 Claims, 5 Drawing Sheets

SYSTEM AND METHOD FOR OPTIMIZING SEARCH RESULTS RANKING THROUGH COLLABORATIVE GAMING

CLAIM OF PRIORITY

This application is a continuation of and claims priority to U.S. patent application Ser. No: 12/684,878, filed on Jan. 8, 2010. This disclosure is hereby incorporated by reference herein in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention described herein generally relates to optimizing search result rankings. More specifically, the invention is directed towards systems and methods for utilizing a multiplayer gaming interface to optimize search result rankings based on user relevance feedback.

BACKGROUND OF THE INVENTION

As the Internet continues to exponentially expand, the role of search engines has dramatically increased. The sheer volume of data has quickly become impossible for a human user to manipulate on his or her own. Thus, the use of search engine technology has become a vital tool in the useful operation of the Internet.

A primary economical and functional objective of a search engine is to increase the relevancy of search results for a given query. Primarily displaying the most relevant search results first, followed by search results in descending relevancy, can maximize relevancy. In this regard, a user can quickly identify the most relevant content quickly, ensuring high user retention for a search engine.

Currently, there are two main approaches to maximizing search result relevancy. The original approach is fully automatic with features extracted from the page and its links. However, this approach has become outdated in view of the new face of content added to the Internet. A new approach, used by Google, Microsoft, Yahoo, and recent startups, is to use supervised machine learning methods. Due to the nature of these methods, they require training, which implies training data, hence, the name 'supervised'. The training data may consist of a large number of queries and the corresponding search results. These queries and results can be selected automatically to maximize various objectives such as a random and diverse set of queries but can also be created by humans. The most important part of the human involvement is in grading or assigning a numerical score to each search result so that supervised machine learning methods can learn to optimize.

Concurrent with the growth of computing technologies is the growth of online competitions, including online games. There are known techniques for harnessing user productivity through competitions. By way of example, there are question and answer applications, e.g. Yahoo! Answers, where people get points for answering questions. Users achieve points and online status by answering questions and concurrently, the content of the system itself grows from the user generated content.

More generally, the concept of using games is one of the many technique that full under the general computer trend of crowdsourcing or the games are referred to Games With a Purpose (GWAP). An existing example of GWAP is image labeling to provide a corpus of user generated tag information for static images. There is no prior technique that uses the power of GWAP technologies to improve relevance of search results. Thus there is need in the art of a system that leverages data generated by crowdsourcing and/or GWAP to improve the performance of algorithmic search ranking system and also provide scalability in gathering large amount of user preference data.

SUMMARY OF THE INVENTION

The present invention is directed towards systems and methods for optimizing search result rankings through use of a game interface. In one embodiment, a method provides a game interface to at least two users, the game interface comprising at least one search query and at least two search result sets. The method further detects the selection of one of the two search result sets by the users and updates ranking data in response to the selection of one of the two search results. The user selections are predicated upon competition criteria, which more generally are the instructions of the competition, e.g., instructing the users to select the optimal list of search results. In one embodiment, updating ranking data in response to the selection of one of the two search results further comprises recording an indication of agreement or disagreement between the users.

The method further selects ranking data associated with a given query and determines an optimum ranking based on aggregating the selected ranking data. In one embodiment, determining an optimum ranking based on aggregating the selected ranking data comprises utilizing an integer linear program (ILP) to minimize the objective function or cost function $$C(X) = \Sigma_{a \ne b} n_{ba} x_{ab} \qquad \text{Equation 1}$$

where for a given query, a and b run over the corresponding search results, $n_{ba}$ is the number of times b is selected over a in the input rankings, and $x_{ab}$ is 1 or 0 depending on whether a is selected over b in the final ranking, which is to be found when this ILP is solved. In alternative embodiments, determining an optimum ranking based on aggregating the selected ranking data further comprises applying the integer linear program to the ranking data using a cost function.

The method may further store the optimum ranking In one embodiment, storing the optimum ranking comprises updating a pre-existing ranking data set. In one embodiment, the method may access the optimum ranking and providing a plurality of search results based on the optimum ranking In alternative embodiments, the method may detect a user re-ordering of the provided results set, or the optimum ranking can be used as an objective of the machine learning methods used to create machine learned ranking rules The present invention is further directed towards a system comprising a query-result data store operative to store query-result set pairs, a ranking data store operative to store ranking data and a search results data store operative to store optimum rankings The system further comprises a game server operative to provide a game interface to at least client devices over a network, a rank aggregator, the system operative to perform operations consistent with the method described above.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
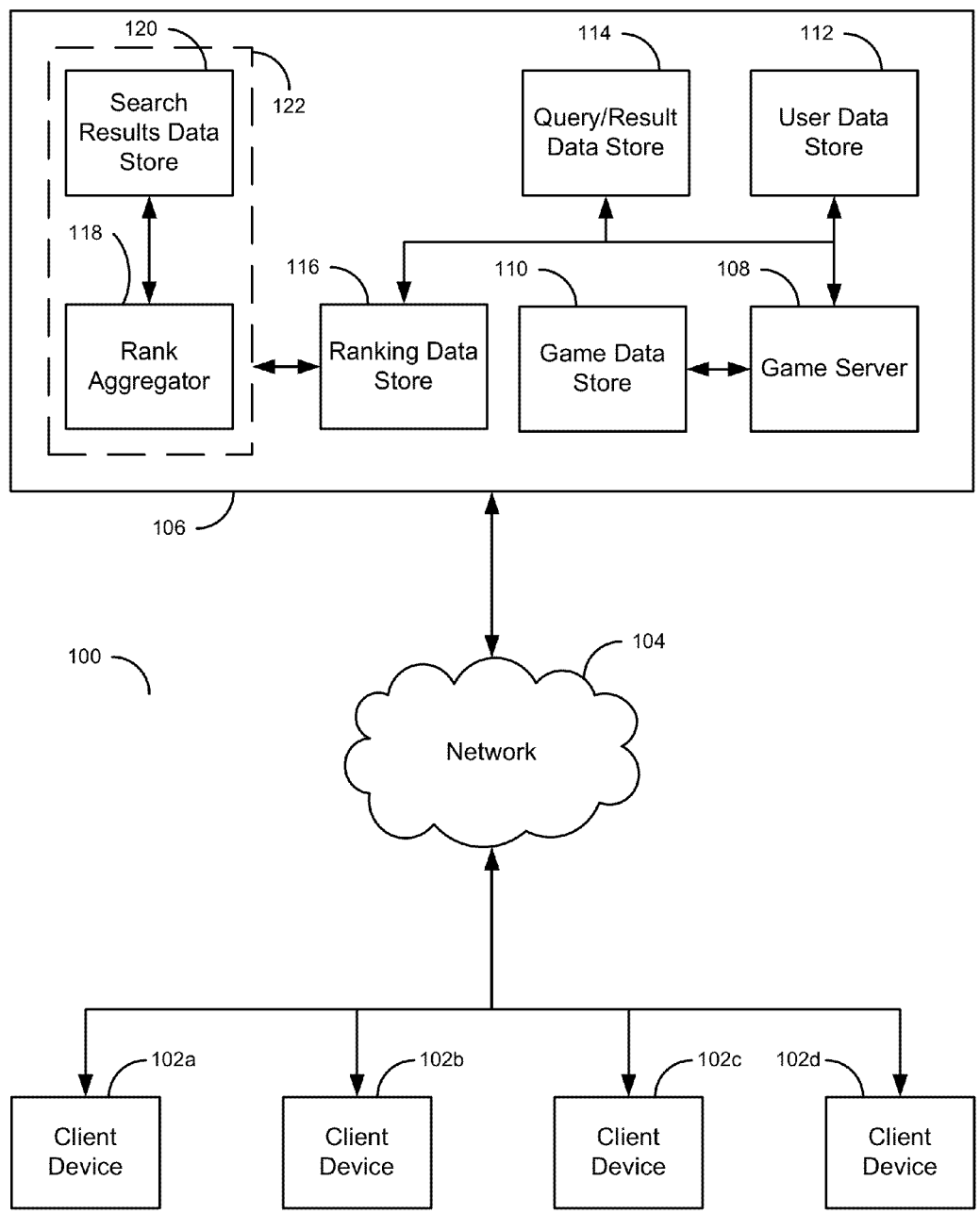
FIG. 1 presents a block diagram depicting a system for optimizing search result rankings through use of a game interface according to one embodiment of the present invention.

FIG. 1 presents a block diagram of a system illustrating one embodiment for optimizing search result rankings through the use of a game interface. As the embodiment of FIG. 1 illustrates, a plurality of client devices 102*a*, 102*b*, 102*c* and 102*d* are electronically connected to a network 104. Network 104 is further electronically connected to a content provider 106. Content provider 106 includes a plurality of hardware and software components including a game server 108, game data store 110, user data store 112, query/result data store 114, ranking data store 116, rank aggregator 118 and search results data store 120.

Although illustrated as single, discrete components, alternative embodiments exist wherein the illustrated devices may be integrated and/or distributed across multiple hardware devices. Additionally, the devices may be distributed geographically in addition to physically. The server 108 may be any suitable physical processing device performing processing operations as described herein, in response to executable instructions. The data store elements 110, 112, 114, 116, 118 and 120 may be any suitable type of storage device operative to electronically store data therein.

In the illustrated embodiment, a plurality of client devices 102*a*, 102*b*, 102*c* and 102*d* are operative to transmit and receive data from content provider 106 via game server 108. Game server 108 may comprise a plurality of hardware and software devices operative to handle requests such as HTTP requests or various requests following other protocols. In the illustrated embodiment, game server 108 may receive a request from client devices 102*a*, 102*b*, 102*c* and 102*d* to participate in an online game. In response the game server 108 may transmit a gaming interface to the client devices 102*a*, 102*b*, 102*c* and 102*d*. The gaming interface may include a plurality of graphical user interface ("GUI") elements as well as various application logic components implemented in a client-side programming language such as JavaScript, ActionScript via Flash, or any other client-side programming language known in the art. It is also recognized that in another embodiment, the gaming interface may be server-side applications instead.

Game server 108 may be further operative to handle client transmissions associated with the game. For example, the gaming interface logic may define a plurality of event handlers to handle game requests such as handlers to start the game, identify a selection, or other suitable game requests as recognized by one skilled in the art, consistent with the gaming operations described in further detail below.

The game server 108 may receive a game initiating request from any of the devices 102*a*-102*d*. In response to initiating the game, the game server 108 may identify a second client device 102*a*, 102*b*, 102*c* or 102*d* to pair with an initiating client device. Therefore, the game server may start a new game between selected client devices, for simplicity of explanation, supposed the initiating device is device 102*a* and it is paired with device 102*d*. As noted above, these devices represent various users interacting with their respective computing device to compete with or against each other in a competition from the game server 108.

In the illustrated embodiment, the game server 108 may determine the second client based on data stored within user data store 112. User data store 112 may include data relating users including, but not limited to, user IDs, user profile data and various data fields identifying the user. For example, the game server 108 may query user data store 112 to identify a user that is currently using the game server 108 and is thus available to play a new game with the requesting user. In one embodiment, a user may comprise an actual user. Alternatively, a user many comprise a simulated user, the simulated user based on previous user behavior, such as the amount of time a real user spent answering a question and their final decision. In yet another alternative, the game may be played entirely with simulated users. Alternatively, game server 108 may use various other metrics to identify a potential user such as the user's skill level, games played, type of game requested, etc. In another embodiment, the user selection may be based upon user-request to compete against selected players.

After matching users, the game server 108 begins the game. In the illustrated embodiment, the game server 108 accesses query/result data store 114 to retrieve the substantive data for the game. In one embodiment, query/result data store 114 may store various pieces of data associated with the game such as a query-result set pair. In one embodiment, a query-result set pair comprises a textual query string and a list of search results associated with the query. In one embodiment, a list of search results may comprise a list similar to that displayed on a search results page. In an alternative embodiment, a list of search results may comprise an image of a search results page listing. In a given game session, the game server 108 may retrieve two query-result set pairs and present the query-result set pair to the users. Two query set pairs may comprise a single query with two exemplary search results listings. Embodiments of query-result pair selection are discussed more fully with respect to FIG. 2.

The specifics of the course of play are described in further detail regarding FIGS. 2-3 below, whereas FIG. 1 describes the general physical processing environment in which the game operations are performed. During the course of play, the game server 108 accesses the game data store 110 to update various game metrics. For example, the game data store 110 may store game statistics associated with a given client device 102*a*, 102*b*, 102*c* and 102*d* such as the number of points awarded, number of games played, etc.

Additionally, the game server 108 may access ranking data store 116 to update ranking data captured during the game. In the illustrated embodiment, game server 108 may update ranking data store 116 based on the input received from users during the game. For example, if the game server 108 detects that the game users have agreed on a result associated with a query, the game server 108 may update ranking data store 116 to illustrate such agreement. In an embodiment wherein two or more results are presented with a single query, an agreement corresponds the selection of the same result set by each player. In the alternative, the game may provide a plurality of results wherein the users are asked to rank the results from best to worst, or worst to best. In this embodiment, an agreement would be calculated based on the agreement between the rankings using a rank correlation method such as Spearman's rank correlation coefficient or Kendall's tau rank correlation coefficient. Conversely, the game server 108 may update the ranking data store 116 if the game server 108 determines that the users did not agree on the appropriate result set ranking associated with a query. In the illustrated embodiment, ranking data store 116 may comprise a plurality of database records, a record containing a query q and a list of ranked results k.

Content provider 106 further includes a rank aggregator 118 and search results data store 120. These components are illustrated as being disposed within the search processor 122. As recognized by one skilled in the art, there exist numerous other processing components of the search processor not illustrated for brevity purposes only. It is also recognized that the content provider 106 can exclude the search processor 122, where the below-described gaming information can be utilized by any number of other processing systems. The gaming result information acquired from the gaming application(s) is usable for any suitable processing operation and is not expressly restricted to search result ranking In the illustrated embodiment, rank aggregator 118 and search results data store 120 may operate as a back-end process, that is, the components 118 and 120 may perform bulk analysis of data stored by the game server 108 within ranking data store 116. The search processor 122 can receive the gaming data and use this data to augment machine learning operations, as described in further detail below.

As illustrated in FIG. 1 components 118 and 120 may be part of a separate system from the gaming system. In one embodiment, ranking data store 116 may allow multiple systems in addition to components 118 and 120. In this respect, the gaming system may provide the gathered ranking data to a plurality of systems such as various machine learning systems that require ranking data as input.

In the illustrated embodiment, rank aggregator 118 may then aggregate the ranking data for a given query. Various embodiments for aggregating ranking data are discussed more fully with respect to FIG. 3, and are thus omitted for the sake of clarity.

Rank aggregator 118 is further coupled to search results data store 120. In one embodiment, search results data store 120 may comprise a database associating search queries with search rankings The search results data store 120 may further comprise a data store used by a search engine, the data store providing search results data to the search engine. In alternative embodiments, the search results data store 120 may operate as an independent search results data store. That is, the search results data store 120 may be structurally similar to a production search results data store, but may be used solely for analytic purposes, e.g., to train a machine learned ranking model, compared with a production search results data store that is used for real term search results to users entering search requests in a live, fully functioning, publicly accessible and usable search engine.

In the illustrated embodiment, the rank aggregator 118 may be operative to update the search results data store 120 with the search ranking for a given query based on the aggregation of user ranking or score received during the course of the game play, as described in further detail below.

Figure 2:
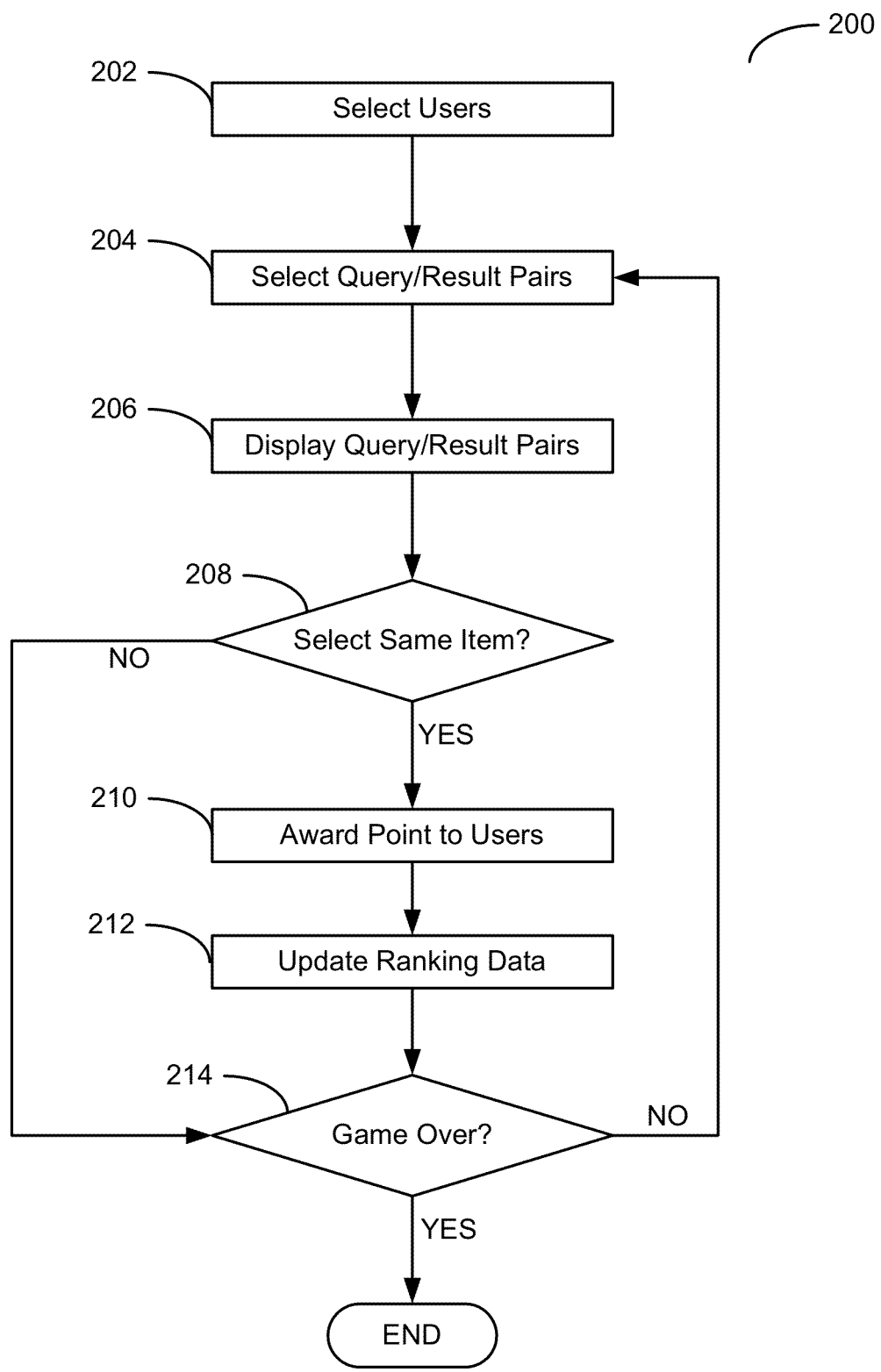
FIG. 2 presents a flow diagram illustrating a method for providing a game interface to a user according to one embodiment of the present invention.

FIG. 2 presents a flow diagram illustrating a method for providing a game interface to a user. According to the embodiment that FIG. 2 illustrates, a method 200 selects a plurality of users, step 202. In one embodiment, selecting a plurality of users comprises identifying two users available to participate in a game, based on a request from one of the users or both of the users. For example, in response to a request to play from User A, the method 200 may identify an available User B and initiate a game session between the two users. User selection may further include, in various embodiments, users logging into a gaming system, setting up or accessing an existing profile and possibly entering various background information. Users may also be tested first to determine if they are humans or bots. Testing may use golden data that is manually created or manually verified for quality. In one embodiment, the selection of users may be randomly determined by the method 200.

The method 200 then selects a query-results pair step 204. Selection of queries and result sets may be determined on a random or quasi-random basis, depending on system configuration. In the illustrated embodiment, selecting a query-result pair may comprise selecting a search query and identifying a search result set for a given query. In one embodiment, a search result set contains two results, the results being, for example, the listed hyperlinks. As used herein, a set is a list of search results, the results being the listed data entries, e.g. the entries 1, 2 and 3 in the Table below. In an alternative embodiment, a search result set may comprise a plurality of results, wherein a determined degree of agreement between users generates a score proportional to the degree of similarity chosen between two users. For example, the method 200 may randomly select a query "javascript". In response to selecting a query, the method 200 then may select a result set as follows:

TABLE 1

| Results 1 |
| --- |
| 1. JavaScript—Wikipedia, the free encyclopedia<br>en.wikipedia.org/wiki/JavaScript |
| 2. Java Downloads for All Operating Systems . . .<br>www.java.com/en/download/manual.jsp |
| 3. Firefox web browser \| Faster, more secure . . .<br>www.mozilla.com/firefox/ |

| Results 2 |
| --- |
| 1. JavaScript.com (TM)—The Definitive JavaScript Resource . . .<br>www.javascript.com |
| 2. JavaScript—Wikipedia, the free encyclopedia<br>en.wikipedia.org/wiki/JavaScript |
| 3. JavaScript Source: Free JavaScripts, Tutorials, Example Code . . .<br>javascript.internet.com |

In the previously mentioned alternative embodiment, users may be presented with a single result set of Table 1 (e.g., Results 1) wherein the users may rank the results and a degree of agreement or disagreement may be determined.

In an alternative embodiment, the method 200 may select a single result set and select a plurality of queries, wherein the method 200 determines a score based on the similarity between chosen queries. The method 200 then presents the query and search result sets to the users, step 206. In one embodiment, presenting the query and search result sets may comprise updating a client display device to display the query and result sets. For example, the game interface my display both result sets in a side-by-side comparison, whereupon the users are then presented the option to select which of the results sets is the better result set. In one embodiment, a check box may be displayed including options: Result Set 1 and Result Set 2. The user can check the box of the result set selected as being the better option. It is recognized that any other suitable user selection technique may be employed, such as a pulldown menu, data entry box, etc.

Figure 4:
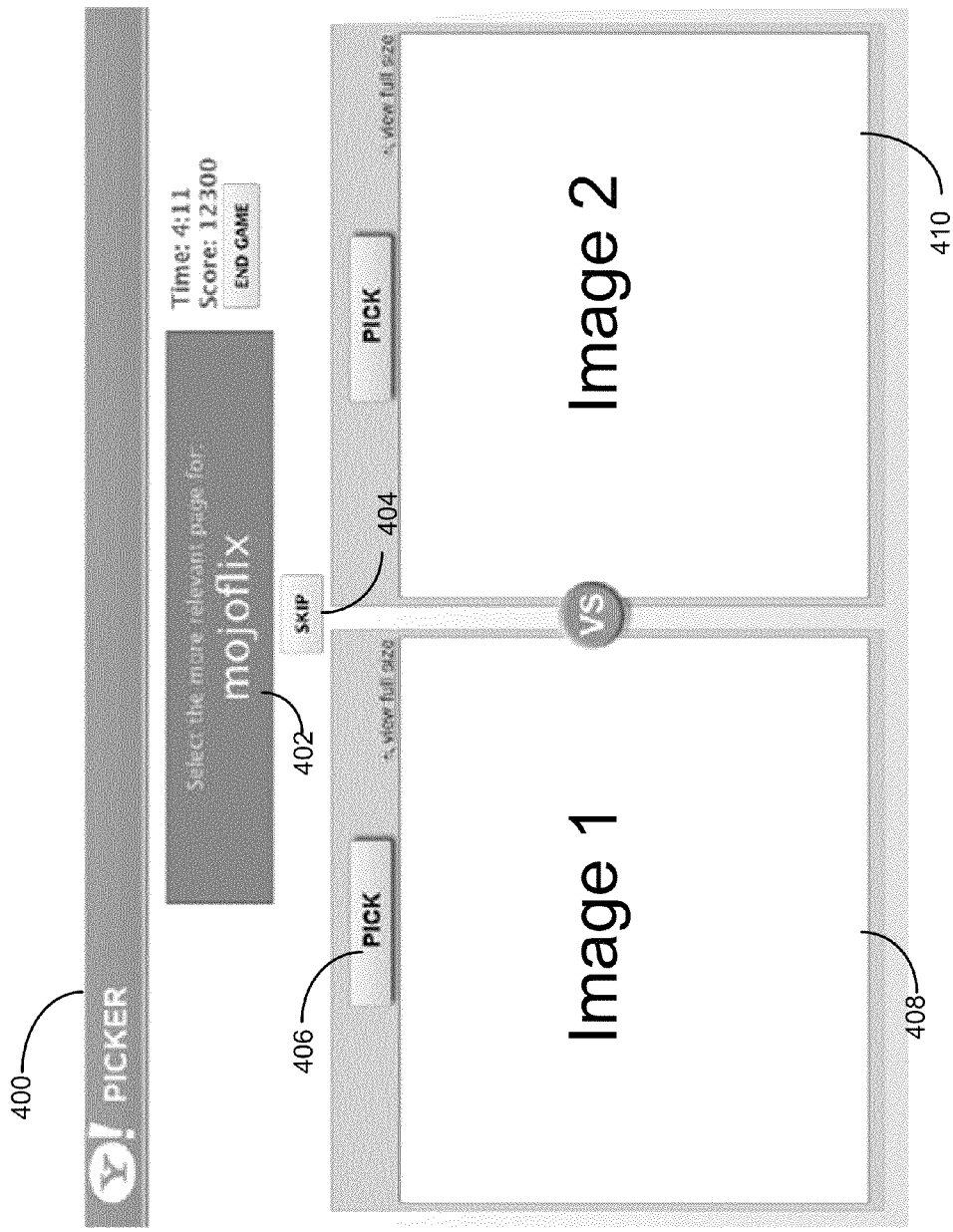
FIG. 4 is a sample screenshot of one embodiment of a game interface.

For further illustration, FIG. 4 illustrates a sample screen shot of a game interface that includes the presentation of two search result screens to the users in a side-by-side comparison. In addition to the search result screenshots, the game interface may also display competition criteria. The competition criteria are the object of the game itself, such as the embodiment of requesting the user to select the better of the two search results. The competition criteria may be changed based on the specifics of the competition, such as if there are more than 2 search result sets, the competition criteria may be for ordering the result sets or selecting the best, worst, etc.

The method 200 reviews the user selections and determines if the users both selected the same item, step 208. It is presumed that if both users select the same item, the selected item is a better search result set then the other unselected result list. If the method 200 determines that the users have not selected the same item, step 208, the method 200 then determines if the game should continue, step 214. If the game continues, the method repeats steps 204, 206, 208, 210, 212 and 214 until an indication of completion is received. In alternative embodiments, the method 200 may update a ranking data store to indicate that the users did not concurrently select the given result sets associated with the query.

If the method 200 determines that the users have selected the same result set, step 208, the method 200 awards points to each of the users, step 210. In one embodiment, awarding points to a user may comprise updating a game data store comprising a plurality of historical game metrics. In addition to awarding points, the method 200 may update ranking data, step 212. In one embodiment, updating ranking data may comprise inserting ranking data comprising a query and an associated ranked list of search results into a ranking data store.

The method 200 continues to present query-result sets until the method 200 determines that the game is over, step 214. In one embodiment, the method 200 may determine that a game session is over based upon a game timer indicating that the allotted playing time has elapsed. In alternative embodiments, the method 200 may determine that a game session is over based on a user exiting the game, or a predetermined number of query-result set pairs being displayed. It is recognized that other embodiments exist for determining when to terminate a game, such as for example when a particular score is reached or a particular number of non-matches are selected.

In alternative embodiments, the method 200 may select a query and a plurality of search results. For example, the game interface may present the two users with more than 2 sets of search results, such as by way of example 5 sets of search results, and the users then select the best result or results. Or, in another embodiment, the users may be presented with more than 2 sets and asked to rank them in order from best to worst. The various types of result set decision gaming operations therefore include corresponding scoring techniques. For example, if the game includes ranking 5 search results from best to worst, the scoring may be graduated based on how many matching order placements, highest scoring being for all 5 ranks matching, or maybe points for matching best and/or worse. Scoring criteria may be based on historical game activity. For example, scoring may incrementally be increased based on consecutive agreements between users. It is recognized that various embodiments may be utilized to correspond gaming operations for search result set selections and rewarding players for their participation in the gaming operations, whereas the scoring operations may be adjusted using any known technique by one skilled in the art and is not expressly limited to any specific scoring technique noted herein.

As noted above, the gaming interface therein provides the ability for presenting multiple users with two or more search result listings and the users engage in a gaming competition through this interface. Relative back to the system 100, the benefits of these gaming competitions can then be integrated back into a search results engine as feedback for the search results quality. For example, if the search result engine determines that multiple users are selecting a particular set of search results as being the least informative, the search results engine may then determine that the underlying algorithms used to generate those particular search results needs to be refined.

Figure 3:
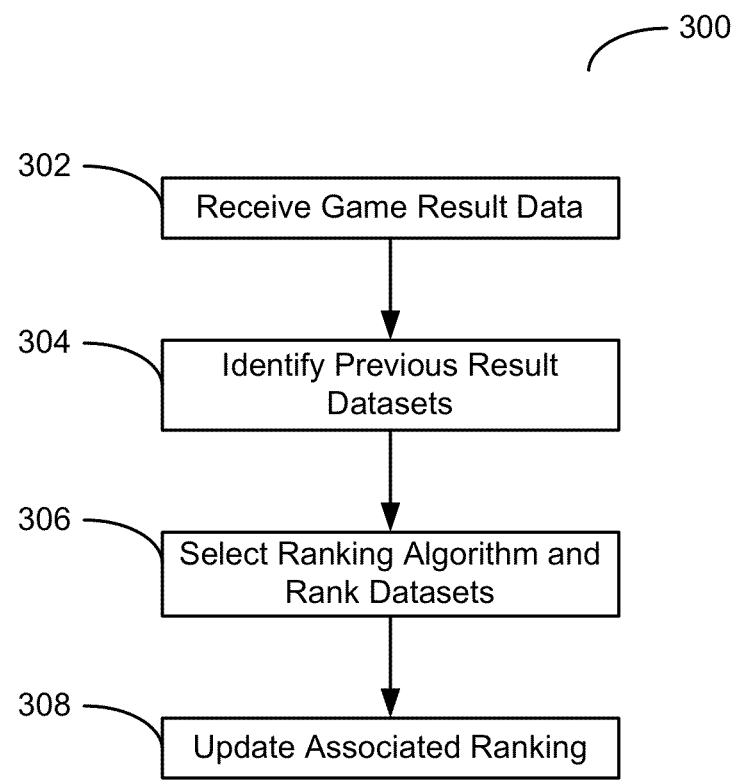
FIG. 3 presents a flow diagram illustrating a method for analyzing aggregate ranking data gathered from a user game interface according to one embodiment of the present invention.

FIG. 3 presents a flow diagram illustrating a method for analyzing aggregate ranking data gathered from a user game interface. According to the embodiment that FIG. 3 illustrates, the method 300 receives game result data, step 302. As described above, the game result data may include data regarding whether a plurality of users agree or disagree on presented search results or how users would rank various search result sets, or any other suitable data as recognized by one skilled in the art.

The method 300 then identifies previous result datasets, step 304. For example, previous result datasets may include result sets from other users playing the same games with the game interface relating to selecting and/or ranking the search result sets. After identifying previous result datasets, method 300 generates a working set, the working set comprising the data retrieved in step 302 and the historical data retrieved in step 304.

The method 300 then selects the appropriate ranking algorithm, step 306. In the illustrated embodiment, the method 300 may utilize an integer linear program ("ILP") to aggregate ranking datasets. In this embodiment, the method 300 minimizes a cost function having the form:

$$C(X) = \sum_{c=b} n_{ba} x_{ab}, \qquad \text{Equation 1}$$

where a and b comprise two rankings $x_{ab}=1$ if a is ranked ahead of b in the aggregate ranking and 0 otherwise, and $n_{ba}$ is the number of input rankings that rank b ahead of a.

Additionally, the algorithm in Equation 2 may be subject to the following constraints:

$$x_{ab}+x_{ba}=1(\forall a,b:a\neq b)$$

$$x_{ab}+x_{bc}+x_{ca}\geq 2(\forall a,b,c:a\neq b,b\neq c,c=a)$$

$$x_{ab}\in\{0,1\}(\forall a,b:a\neq b) \qquad \text{Equation 2:}$$

The constraints in Equation 2 indicate that there must be an ordering between every pair of elements (constraint 1), any ordering cannot include cycles (constraint 2), a is before or after b, and, partial answers are not accepted (constraint 3).

The ILP discussed with respected to Equations 1 and 2 may be applied to a chosen ranking algorithm. In the illustrated embodiment, the method 300 may select the appropriate ranking algorithm. As previously discussed, the method 300 may apply the ILP using the Kemeny Rule (Equation 1) to aggregate ranking data. In alternative embodiments, the method 300 may utilize a predetermined cost function such as:

$$C_1(x) = \sum_{a \neq b} m_{ba} x_{ba}$$

$$C_2(x) = \sum_{a \neq b} m_{ba} g_{ba} x_{ab}$$

$$C_3(x) = \sum_{a \neq b} (\propto m_{ba} + (1 - \propto) m_{ba}) x_{ab}$$

Equation 3

Where $g_{ba}$ is the change in the gain for ranking b ahead of a, that is, the grade associated with the quality of a search result as perceived by a human being, a game player or other humans, and $m_{ba}$ is computed as follows. For the ranking of a and b, let $A_{ba}$ and $D_{ba}$ denote the number of pair-wise agreements and pair-wise disagreements if b is ranked ahead of a. We then set $m_{ba}$ and $m_{ab}$ to $A_{ba}(1+f)$ and $A_{ab}(1+f)$ where $f=(D_{ab}+D_{ba})/(A_{ab}+A_{ba})$, which helps distribute disagreements to each side of agreements proportional to their magnitudes. If there are no agreements, the method sets f=0.5, i.e., equal distribution.

After ranking the result set data, the method 300 updates the associated ranking, step 308. In one embodiment, updating the associated ranking may comprise updating a database associating search queries with search rankings The database may further comprise a data store used by a search engine, the database providing search results data to the search engine. In alternative embodiments, the database may operate as an independent search results data store. That is, the database may be structurally similar to a production search results data store, but may be used solely for analytic purposes.

FIG. 4 is a sample screenshot of one embodiment of a game interface, according to one embodiment of the present invention. As the embodiment of FIG. 4 illustrates, a user interface 400 is provided to a plurality of users. In the illustrated embodiment, the user interface may be presented through use of a web browser or similar software or hardware device.

User interface 400 comprises a query 402, skip button 404, pick button 406 and images 408 and 410. As previously discussed, when starting a game, a randomly selected query 402 is displayed to the user. In addition, the interface 400 displays images 408 and 410. As previously discussed images 408 and 410 may comprise images of search results. In an alternative embodiment, images 408 and 410 may comprise search results to be ranked by users.

The interface provides controls 404 and 406 to gather ranking data as well as provide the user with controls to operate the game. In the illustrated embodiment, a skip button 404 allows a user to skip the current query 402 and images 408 and 410. Additionally, the interface 400 provides pick buttons 406 to allow a user to select which image 408 and 410 that agrees most with the presented query 402.

Figure 5:
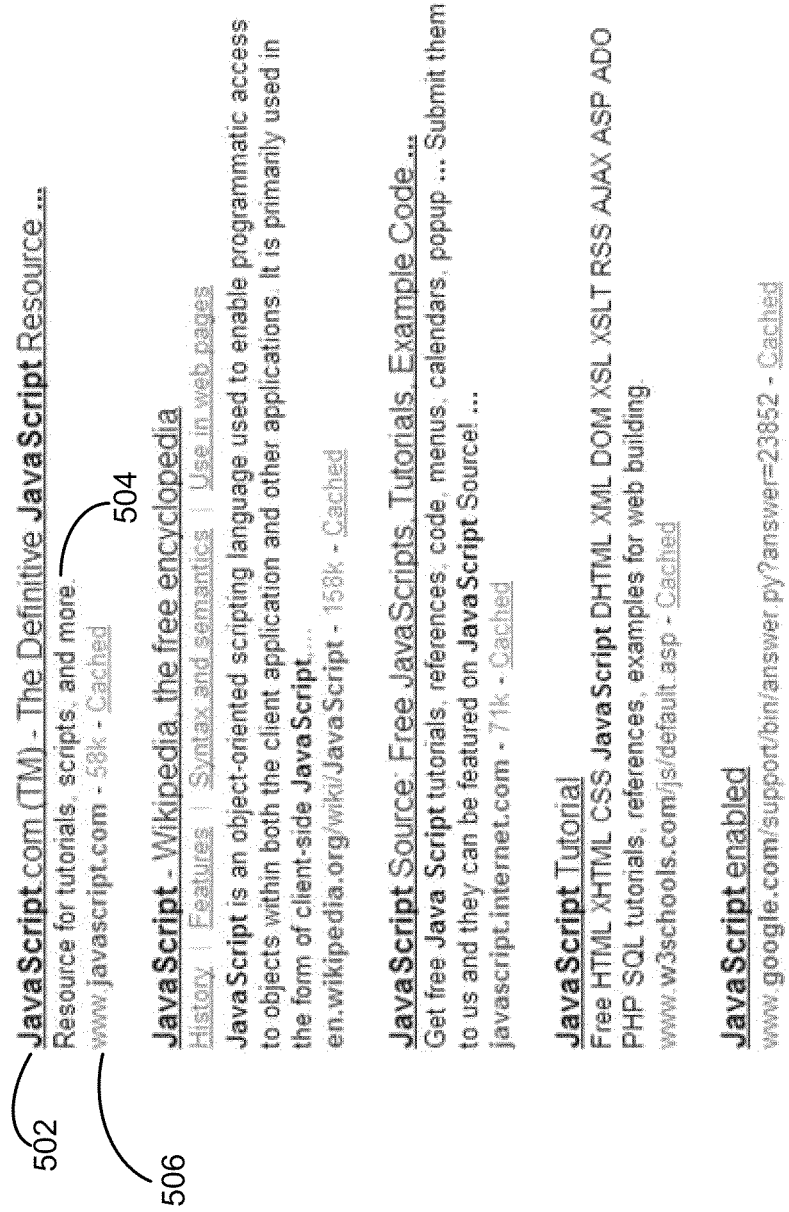
FIG. 5 is a sample screenshot of a search result set that may be displayed in the game interface of FIG. 4.

FIG. 5 is a sample screenshot of a search result set that may be displayed in the game interface of FIG. 4. As the embodiment, of FIG. 5 illustrates, a plurality of search results are contained within the image. Such an image may be generated automatically based on the retrieved query, or may be generated prior to the selection of the query and stored and associated with the query. A given search result contains a description of the search result 502 which may comprise in whole, or in part, the title of a given webpage. Additionally, the search result may comprise a brief description 504 of the result that summarizes a given result for the user. This description 504 may be generated based on identified content within the result. Finally, the search result comprises a URL associated with the search result 506.

As noted above, including regarding the discussion of FIG. 1, the game application and concept of acquiring information through the games is not expressly limited to searching applications. The gaming application and gaming interface allows for the collection of user generated information relating to search results, where this information is then usable for any number of suitable purposes. As noted above, one purpose can be for the machine learning of routines relating to search engines. The gaming data is usable for the machine learning for improving the accuracy of search engines. The gaming data can be usable for other recognized purposes, including advertisement ranking or advertisement placement.

The gaming data allows for acquisition of user-feedback data relating to the machine-learned algorithms for associating various data fields. In the example of a search result game, it receives user-feedback data relating to the algorithms for associating search terms with search results. This basic association data can be usable for any number of suitable machine learning purposes, as recognized by one skilled in the art.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein.

Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A computerized method for optimizing search result rankings through use of a game interface, the method comprising:

electronically, via a processing device, receiving from a plurality of users, requests to engage in an electronic competition via a game interface;

providing the game interface to a first user and a second user in response to the requests, the game interface presenting a plurality of search result sets and at least one textual search query to the first user and the second user, the plurality of search result sets indicative of possible search result sets based on the at least one textual search query wherein each search result set includes a plurality of search results;

providing a game objective and game instructions to the first user and the second user via the game interface, wherein the game objective includes determining a most relevant result set from the plurality of search result sets for the at least one textual search query, the game instructions are for the first user and the second user to select at least one of the plurality of search result sets based on a competition criteria;

electronically, via the processing device, receiving selection commands from the first user and the second user, the selection commands indicating a user selection of the at least one of the plurality of search result sets relative to the game objective;

updating ranking data for search result data associated with the at least one textual search query and the plurality of search results in response to the selection commands; and determining an optimum ranking for the plurality of search results in response to a search request including the at least one textual search query using the updated ranking data.

2. The method of claim 1 further comprising identifying at least two users available to participate in a game based on the requests to engage in an electronic competition.

3. The method of claim 1 further comprising receiving selections of best result sets of the first user and the second user from the plurality of search result sets.

4. The method of claim 3 further comprising generating a score based on similarities between the best result sets of the first user and the second user.

5. The method of claim 1 further comprising receiving rankings of the plurality of search result sets for the at least one textual search query from the first user and the second user.

6. The method of claim 5 further comprising generating a score based on an agreement between the rankings of the plurality of search result sets for the at least one query received from the first user and the second user.

7. The method of claim 1 further comprising receiving a selection of one or more queries for a given search result set from the first user and the second user.

8. The method of claim 7 further comprising generating a score based on similarities between queries chosen by the first user and the second user.

9. The method of claim 1 wherein providing the game interface to the first user and the second user comprises presenting two or more search result screens to the first user and the second user in a side-by-side comparison.

10. The method of claim 1 wherein the game objective includes ranking the plurality of search result sets.

11. The method of claim 1 wherein the selection commands are used in machine learning to associate search terms with search results.

12. An apparatus for optimizing search result rankings through use of a game interface, the apparatus comprising:

a non-transitory computer readable medium having executable instructions stored thereon; and a processing device, in response to the executable instructions, operative to:

receive from a plurality of users, requests to engage in an electronic competition via a game interface;

provide the game interface to a first user and a second user in response to the requests, the game interface presenting a plurality of search result sets and at least one textual search query to the first user and the second user, the plurality of search result sets indicative of possible search result sets based on the at least one textual search query wherein each search result set includes a plurality of search results;

provide a game objective and game instructions to the plurality of users via the game interface, wherein the game objective includes determining a most relevant result set from the plurality of search result sets for the at least one textual search query, the game instructions are for the plurality of users to select at least one of the plurality of search result sets based on a competition criteria;

receive selection commands from the first user and the second user, the selection commands indicating a user selection of the at least one of the plurality of search result sets relative to the game objective;

update ranking data for search result data associated with the at least one textual search query and the plurality of search results in response to the selection commands; and determine an optimum ranking for the plurality of search results in response to a search request including the at least one textual search query using the updated ranking data.

13. The system of claim 12 wherein the processing device is further operative to generate a score based on an agreement between the selection commands received from the first user and the second user.

14. The system of claim 12 wherein the processing device is further operative to receive a selection of one or more queries for a given search result set from the first user and the second user.

15. The system of claim 14 wherein the processing device is further operative to generate a score based on similarities between queries chosen by the first user and the second user.

16. The system of claim 12 wherein providing the game interface to the first user and the second user comprises presenting two or more search result screens to the first user and the second user in a side-by-side comparison.

17. A computerized method for optimizing search result rankings through use of a game interface, the method comprising:
- selecting a plurality of users by a processing device;
- selecting a given textual search query by the processing device;
- electronically, via the processing device, retrieving a plurality of search result sets for the given textual search query;
- presenting the given textual search query, retrieving a plurality of search results sets for the plurality of users;
- receiving a selection of the plurality of search result sets from each of the plurality of users, each of the received selections indicating a user selection of at least one of the plurality of search result sets;
- electronically, via the processing device, determining one or more similarities between the selections received from the plurality of users;
- awarding points to the plurality of users based on the one or more similarities between the selections;
- selecting a given search result set;
- retrieving a plurality of textual search queries for the given search result set;
- presenting the given search result set and the plurality of textual search queries;
- receiving a selection of the plurality of textual search queries from each of the plurality of users; and
- updating ranking data for search result data in response to the selection of the plurality of textual search queries from each of the plurality of users.

18. The method of claim 17 further comprising determining an optimum ranking using the updated ranking data.

* * * * *